(12) United States Patent
Yu

(10) Patent No.: US 7,481,565 B2
(45) Date of Patent: Jan. 27, 2009

(54) LIGHT GUIDE PLATE

(75) Inventor: Tai-Cherng Yu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 180 days.

(21) Appl. No.: 11/411,581

(22) Filed: Apr. 26, 2006

(65) Prior Publication Data

US 2007/0058394 A1    Mar. 15, 2007

(30) Foreign Application Priority Data

Sep. 14, 2005    (CN)    .................. 2005 1 0037339

(51) Int. Cl.
     *F21V 7/04*      (2006.01)
(52) U.S. Cl. .................. 362/619; 362/615; 362/617
(58) Field of Classification Search .......... 362/600–633
See application file for complete search history.

(56) References Cited

U.S. PATENT DOCUMENTS

| | | | | |
|---|---|---|---|---|
| 6,011,602 A | * | 1/2000 | Miyashita et al. | 349/65 |
| 6,925,243 B2 | * | 8/2005 | Lin | 385/146 |
| 2001/0002165 A1 | * | 5/2001 | Shinohara et al. | 362/31 |
| 2005/0052732 A1 | | 3/2005 | Chen et al. | |
| 2005/0122743 A1 | | 6/2005 | Lin | |
| 2005/0243575 A1 | * | 11/2005 | Kunimochi | 362/606 |

FOREIGN PATENT DOCUMENTS

| | | |
|---|---|---|
| CN | 2641666 Y | 9/2004 |
| CN | 1607435 A | 4/2005 |
| CN | 1627151 A | 6/2005 |
| EP | 1016817 B1 | 10/2003 |

* cited by examiner

*Primary Examiner*—Sandra O'Shea
*Assistant Examiner*—James W Cranson
(74) *Attorney, Agent, or Firm*—Andrew C. Cheng

(57) ABSTRACT

A light guide plate a light incidence surface, a light-emitting surface joining with the light incidence surface, a diffraction grating having a plurality of grating slots formed on the light-emitting surface, and a bottom surface on an opposite side of the light guide plate to the light-emitting surface. The diffraction grating converts light that has been dispersed by reflection and refraction into plane parallel light thus increasing brightness.

11 Claims, 2 Drawing Sheets

LIGHT GUIDE PLATE

BACKGROUND

1. Technical Field

The present invention relates to light guide plates, and more particularly to a light guide plate used in a liquid crystal display device.

2. Description of Related Art

A liquid crystal display device has characteristics of lightness (in weight), thinness, low power consumption, etc. Liquid crystal display devices are widely used in communication devices, consumer devices, etc. The liquid crystal used in liquid crystal display device itself cannot radiate light, but it can receive light and is capable of manipulating the received light. This means that the liquid crystal display device requires a surface light source in order to display images and data. In a liquid crystal display device, a backlight module is used as the surface light source. The backlight module converts electric energy to light energy, and a light guide plate in the backlight module then converts the supplied light into a uniform surface light for displaying the images and data. The light guide plate is one of the key components of the backlight module. In order to ensure that the surface light has a uniform brightness and color, the light guide plate must be well designed.

A typical backlight module includes a light guide plate and a light source arranged adjacent to one side of the light guide plate. The light guide plate includes a light incidence surface, a light-emitting surface joined with the light incidence surface, and a bottom surface on an opposite side of the light guide plate to the light-emitting surface. A plurality of scattering-dots can be formed on the light-emitting surface. The scattering-dots are generally hemispherical in shape. The light emitted by the light source enters into the light guide plate through the light incidence surface. The light is transferred forward into the light guide plate, and then exits from the light-emitting surface.

The scattering-dots can reflect and refract the light. After reflection and refraction, the light becomes a dispersed, only a small amount of light exits from the direction perpendicular to the light-emitting surface, so the backlight module has low brightness.

What is needed, therefore, is a light guide plate having high brightness.

SUMMARY

In a preferred embodiment, a light guide plate includes a light incidence surface, a light-emitting surface joining with the light incidence surface, a diffraction grating having a plurality of slots formed on the light-emitting surface, and a bottom surface on an opposite side of the light guide plate to the light-emitting surface.

Other advantages and novel features will become more apparent from the following detailed description of present light guide plate, when taken in conjunction with the accompanying drawings.

BRIEF DESCRIPTION OF THE DRAWINGS

Many aspects of the light guide plate can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EMBODIMENTS

Figure 1:
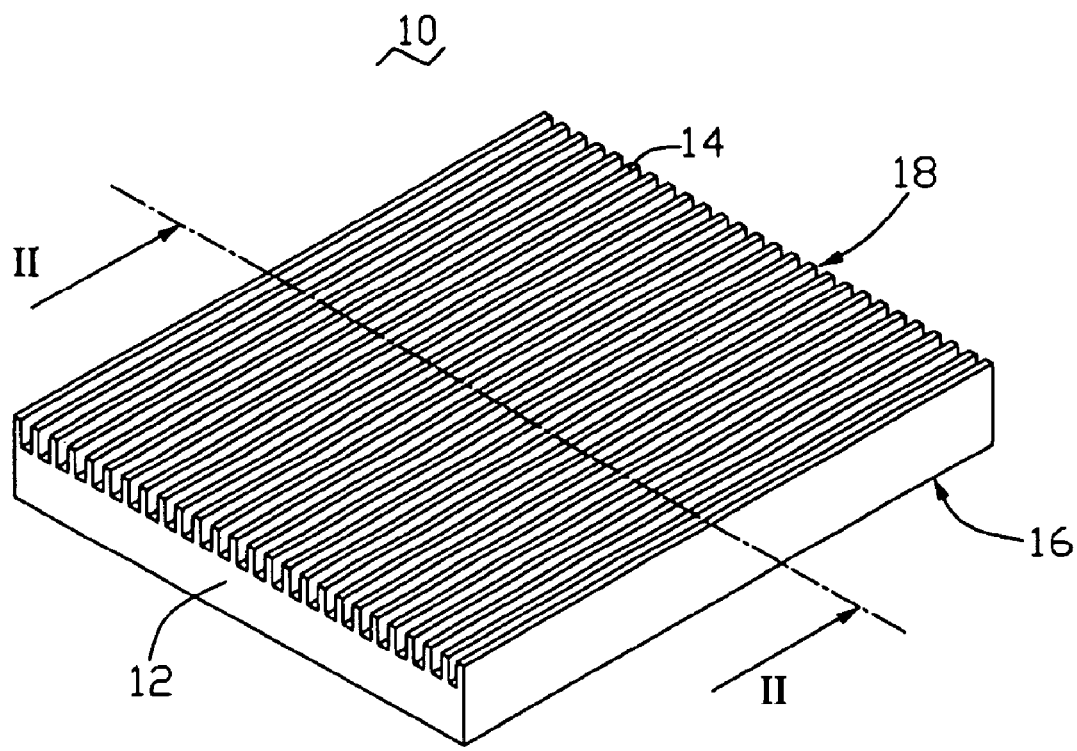
FIG. 1 is a perspective view of a light guide plate, in accordance with a first preferred embodiment.

Reference will now be made to the drawing figures to describe the preferred embodiment of the present light guide plate in detail.

Figure 2:
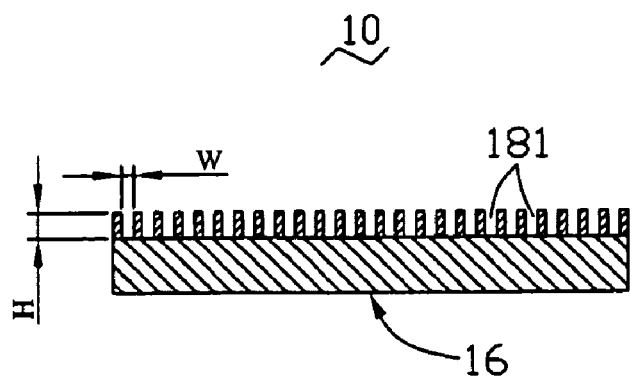
FIG. 2 is a cross-sectional view of FIG. 1, taken along line II-II thereof.

Referring to FIGS. 1 and 2, a light guide plate 10 is shown according to a first preferred embodiment. The light guide plate 10 includes a light incidence surface 12, a light-emitting surface 14, and a bottom surface 16. The light-emitting surface 14 is joined with the light incidence surface 12. The bottom surface 16 is on an opposite side of the light guide plate 10 to the light-emitting surface 14.

The light guide plate 10 is a flat sheet having uniform thickness. The light guide plate 10 is made of transparent material, such as acrylic resin, polycarbonate, or polyethylene resin, etc.

The light guide plate 10 further includes a diffraction grating 18 formed on the light-emitting surface 14 thereof. The diffraction grating 18 includes a plurality of slots 181. The slots 181 are arranged in a direction substantially perpendicular to the light incidence surface 12. A width of each slot 181 is labeled with a reference character W and a depth thereof is labeled with a reference character H. A value of W is in the range from 1 micron to 10 microns and a value of H is in the range from 0.5 micron to 2 microns.

The diffraction grating 18 is integrated with the light guide plate 10. The method for manufacturing the diffraction grating 18 can be a die-casting process, an electron beam etching process, or an electroforming process.

The outside light enters into the light guide plate 10 through the light incidence surface 12. After the light is reflected by the bottom surface 14, the light is transmitted to the light-emitting surface 16. The light is diffracted by the diffraction grating 18 and exits via the light-emitting surface 14. The diffraction grating 18 can diffract light beams with different incident directions, converting them into plane, substantially parallel light beams with the substantially same direction. Thus, the light guide plate 10 transmits light with high brightness.

The light guide plate 10 can also be a wedge-shaped sheet, with the thickness of the light guide plate 10 decreasing away from the light incidence surface 12.

Figure 3:
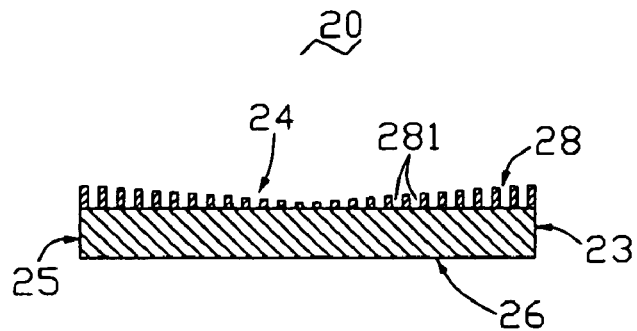
FIG. 3 is a cross-sectional view of a light guide plate in accordance with a second preferred embodiment.

Referring to FIG. 3, a light guide plate 20 is shown in accordance with a second embodiment. The light guide plate 20 includes a light-emitting surface 24, a bottom surface 26, a first side surface 23, and a second side surface 25. The bottom surface 26 is at an opposite side to the light-emitting surface 24, the first side surface 23 is at an opposite side to the second side surface 25, and both the first side surface 23 and the second side surface 25 are perpendicular to the light-emitting surface 24.

A diffraction grating 28 is formed on the light-emitting surface 24. The diffraction grating 28 includes a plurality of slots 281. The slots 281 are arranged in a direction substantially parallel with the side surface 23. The widths of the slots 281 are in the range from 1 micron to 10 microns. The heights of the grating slots 281 are in the range from 0.5 microns to 2 microns. The depths of the slots 281 increase from a center of the grating 28 towards the first side surface 23 and the second side surface 25. The top tie line of the diffraction grating 28 is a concave-curved line.

The diffraction grating 28 diffracts the lights with different directions and the light exits from the light-emitting surface 24 with a high brightness.

Figure 4:
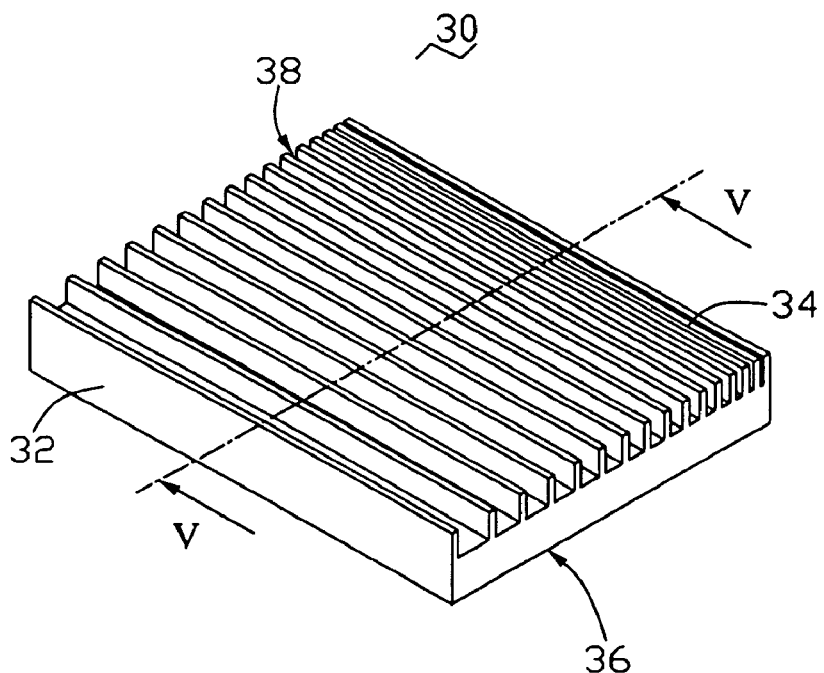
FIG. 4 is a perspective view of a light guide plate in accordance with a third preferred embodiment.
Figure 5:
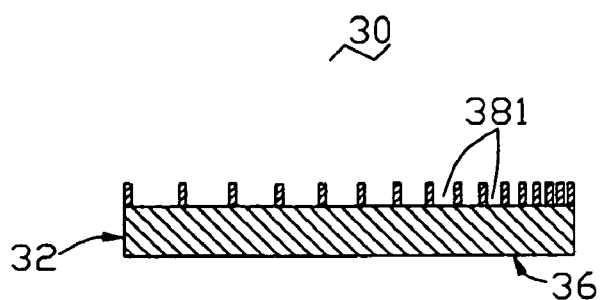
FIG. 5 is a cross-sectional view of FIG. 4, taken along line V-V thereof.

Referring to FIGS. 4 and 5, a light guide plate 30 is shown in accordance with a third preferred embodiment. The light guide plate 30 includes a light incidence surface 32, a light-emitting surface 34 joined with the light incidence surface 32, and a bottom surface 36 on an opposite side of the light guide plate 10 to the light-emitting surface 34.

The light guide plate 30 is substantially flat plate having uniform thickness. The light guide plate 30 is made of transparent material, such as acrylic resin, polycarbonate, or polyethylene resin, etc.

A diffraction grating 38 is formed on the light-emitting surface 34. The diffraction grating 38 includes a plurality of slots 381. The slots 381 are arranged in a direction that is parallel with the light incidence surface 32. The widths of the slots 381 are in the range from 1 micron to 10 microns and the depths of the slots 381 are in the range from 0.5 micron to 2 microns.

The widths of the slots 381 can decrease along a direction away from the light incidence surface 32.

Although the present invention has been described with reference to specific embodiments, it should be noted that the described embodiments are not necessarily exclusive, and that various changes and modifications may be made to the described embodiments without departing from the scope of the invention as defined by the appended claims.

What is claimed is:

1. A light guide plate comprising:
   a light incidence surface;
   a light-emitting surface joining with the light incidence surface;
   a diffraction grating having a plurality of slots formed on the light-emitting surface, wherein depths of the slots increase from a center of the diffraction grating to each of two opposite sides of the diffraction grating, and edges of the opposite sides are parallel to the slots; and
   a bottom surface on an opposite side of the light guide plate to the light-emitting surface.

2. The light guide plate as claimed in claim 1, wherein a transverse width of each slot is in the range from 1 micron to 10 microns.

3. The light guide plate as claimed in claim 1, wherein a depth of each slot is in the range from 0.5 microns to 2 microns.

4. The light guide plate as claimed in claim 1, wherein the slots of the diffraction grating are parallel with the light incidence surface.

5. The light guide plate as claimed in claim 4, wherein a transverse width of each slot decreases along a direction away from the light incidence surface.

6. The light guide plate as claimed in claim 1, wherein the light guide plate is one of a flat sheet having uniform thickness and a wedge-shaped block.

7. A light guide plate comprising:
   a light incidence surface;
   a light-emitting surface joining with the light incidence surface;
   a diffraction grating having a plurality of slots formed on the light-emitting surface, wherein a transverse width of each slot decreases along a direction away from the light incidence surface; and
   a bottom surface on an opposite side of the light guide plate to the light-emitting surface.

8. The light guide plate as claimed in claim 7, wherein the transverse width of each slot is in the range from 1 micron to 10 microns.

9. The light guide plate as claimed in claim 7, wherein a depth of each slot is in the range from 0.5 microns to 2 microns.

10. The light guide plate as claimed in claim 7, wherein the slots of the diffraction grating are parallel with the light incidence surface.

11. The light guide plate as claimed in claim 7, wherein the light guide plate is one of a flat sheet having uniform thickness and a wedge-shaped block.

* * * * *